No. 878,445. PATENTED FEB. 4, 1908.
R. E. ZIMMERMAN.
HAY BALER.
APPLICATION FILED MAY 4, 1907.
4 SHEETS—SHEET 3.
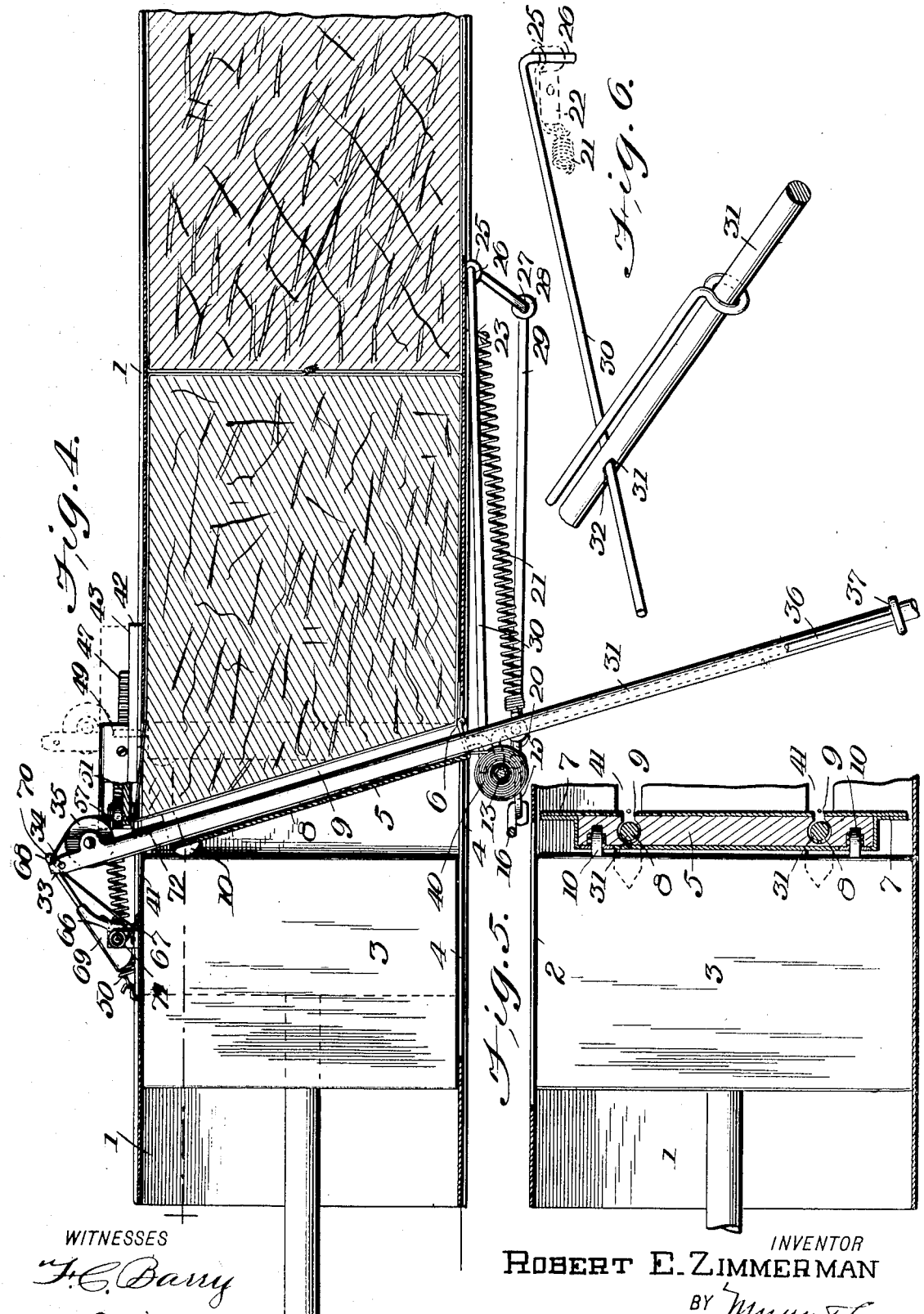
WITNESSES
INVENTOR
ROBERT E. ZIMMERMAN
BY 
ATTORNEYS No. 878,445.
R. E. ZIMMERMAN.
HAY BALER.
APPLICATION FILED MAY 4, 1907.
PATENTED FEB. 4, 1908.
4 SHEETS—SHEET 4.
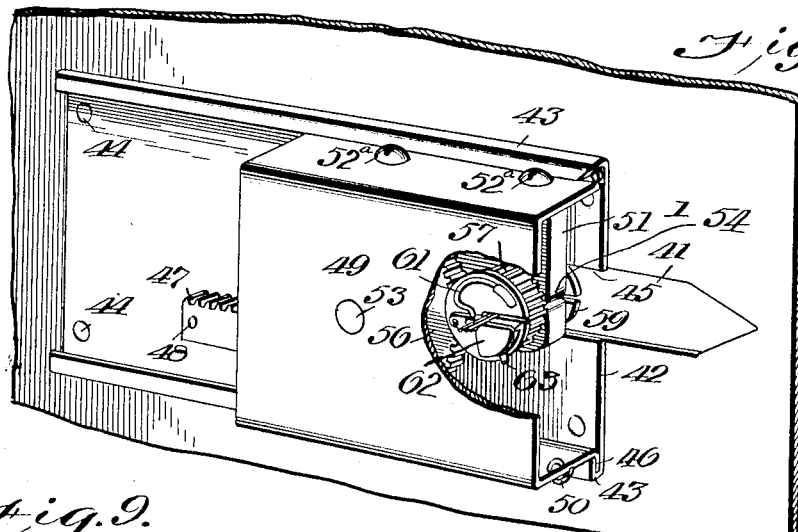
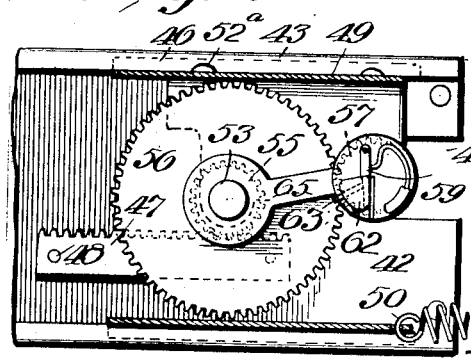
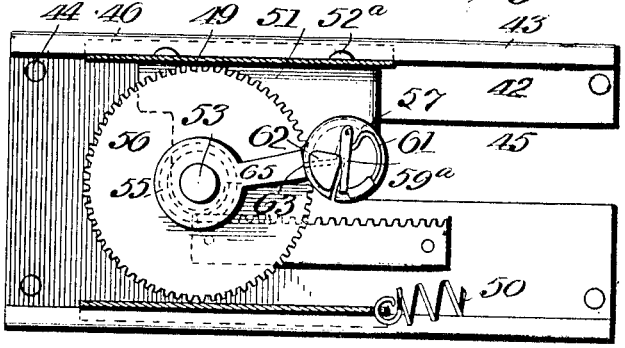
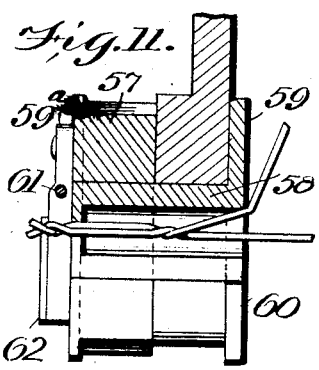
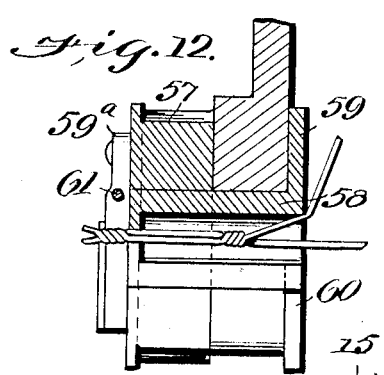
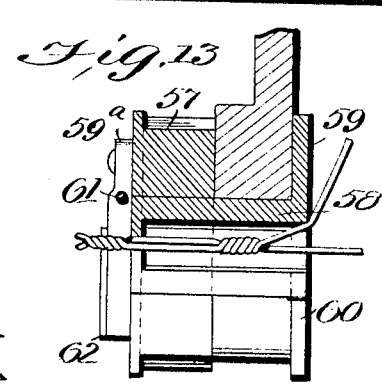
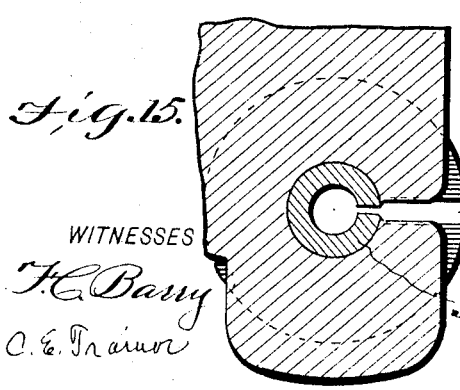
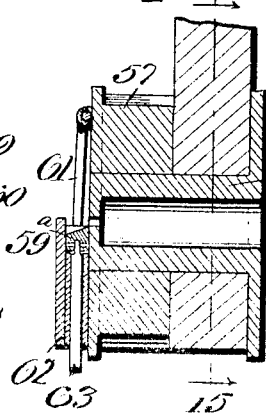
WITNESSES
F. C. Barry
C. E. Trainor
INVENTOR
Robert E. Zimmerman
BY
ATTORNEYS

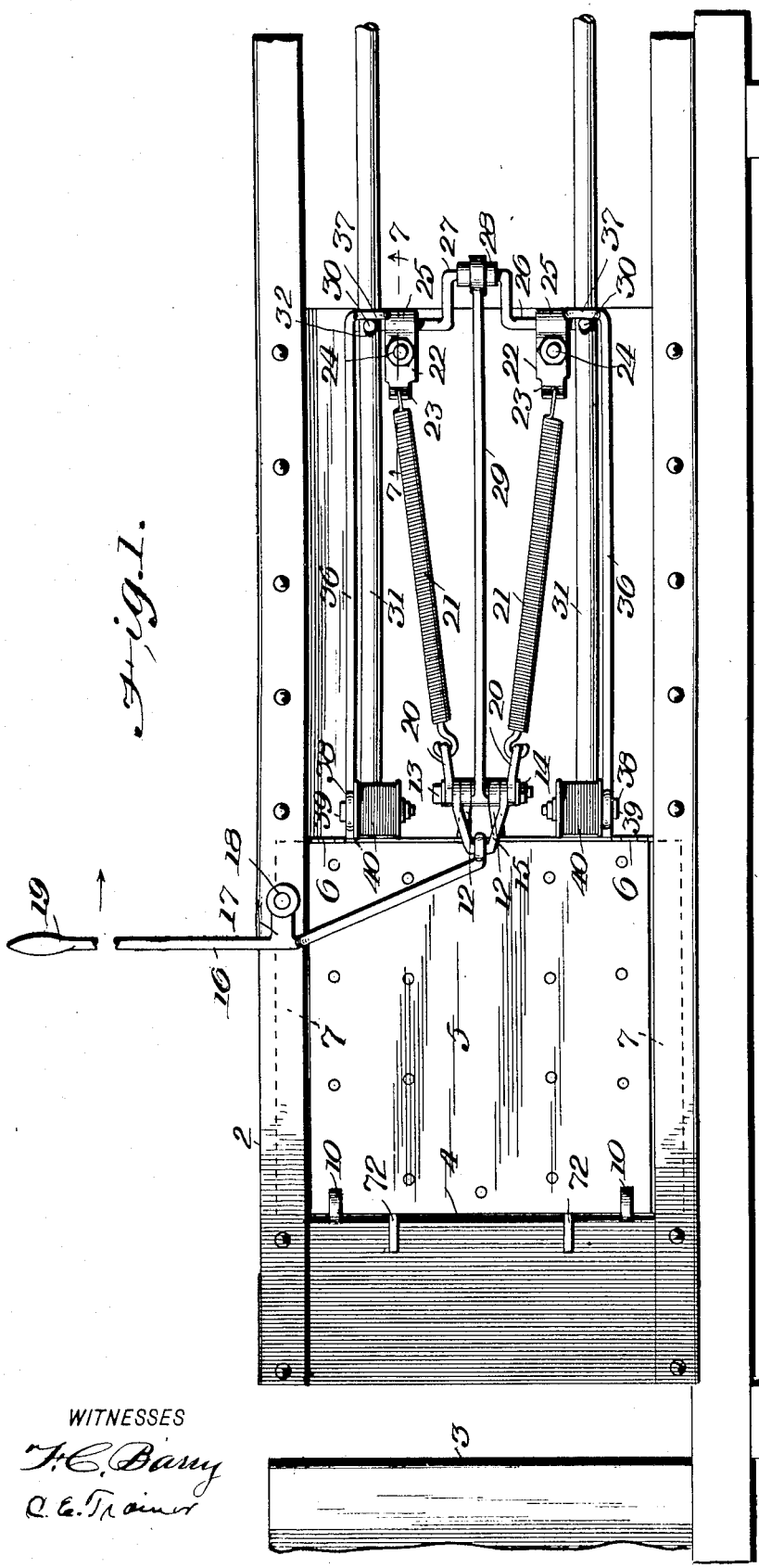

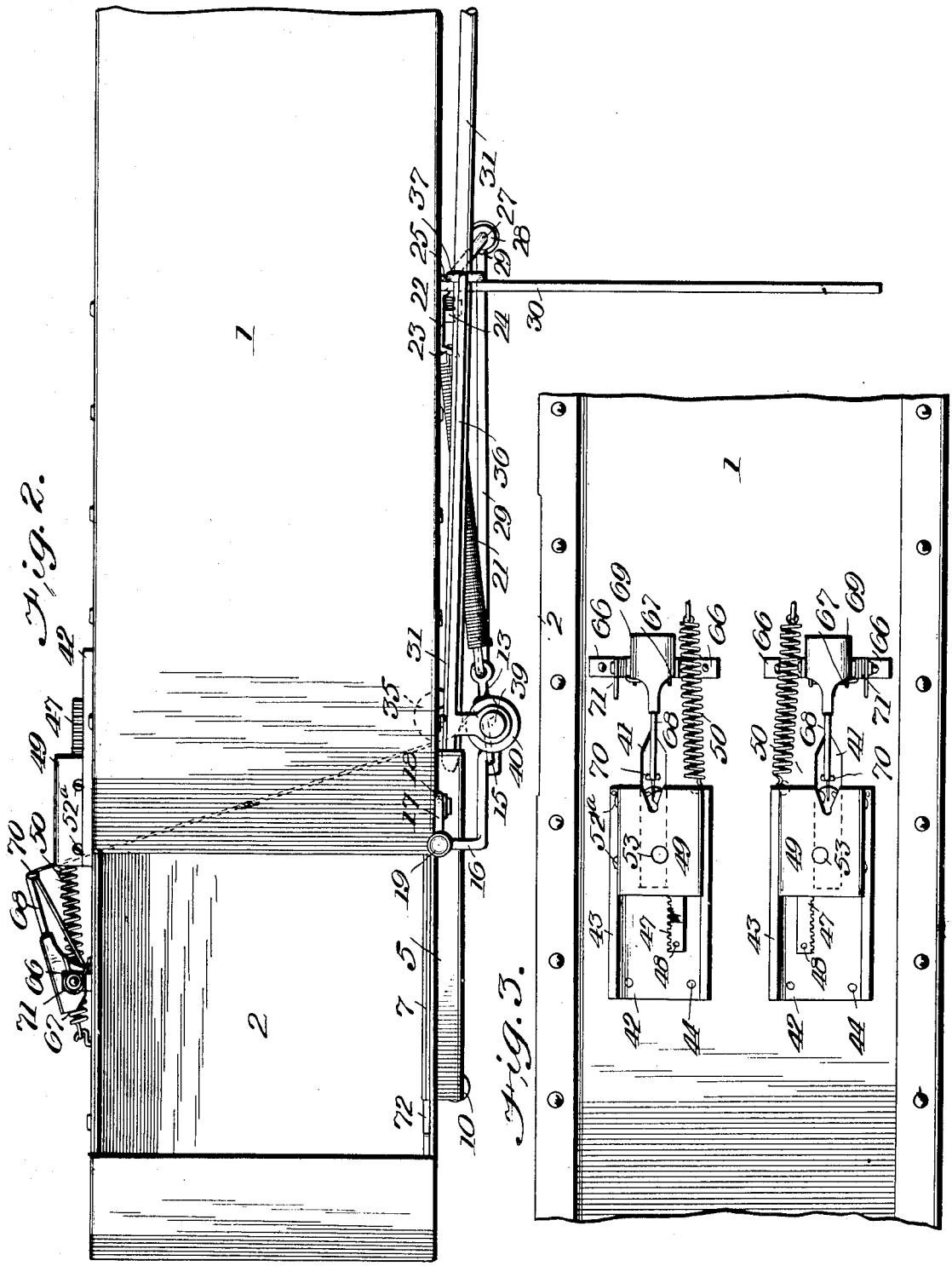

UNITED STATES PATENT OFFICE.

ROBERT E. ZIMMERMAN, OF TROY, KANSAS, ASSIGNOR OF ONE-THIRD TO SARDIUS M. BREWSTER, OF TROY, KANSAS.

HAY-BALER.

No. 878,445.      Specification of Letters Patent.      Patented Feb. 4, 1908.

Application filed May 4, 1907. Serial No. 371,767.

*To all whom it may concern:*

Be it known that I, ROBERT E. ZIMMERMAN, a citizen of the United States, and resident of Troy, in the county of Doniphan and State of Kansas, have invented an Improvement in Hay-Balers, of which the following is a specification.

My invention is an improvement in hay balers, and consists in certain novel constructions and combinations of parts hereafter described and claimed.

Referring to the drawings forming a part hereof—Figure 1 is a side view of a part of a hay baler frame with my improvement. Fig. 2 is a top plan view. Fig. 3 is a partial side view looking at the opposite side from that shown in Fig. 1. Fig. 4 is a horizontal section. Fig. 5 is a vertical section through the door. Fig. 6 is a detail of the needle and the needle driver. Fig. 7 is a section on the line 7—7 of Fig. 1. Fig. 8 is a perspective view of the twister. Fig. 9 is a longitudinal vertical section through the same showing the twisting mechanism in one position. Fig. 10 is a similar view showing the twisting mechanism in another position. Fig. 11 is a transverse vertical section through the twisting mechanism, showing the first twist. Fig. 12 is a similar view showing the second twist. Fig. 13 is a similar view showing the third twist. Fig. 14 is a similar view taken at right angles to Figs. 11, 12, and 13; and Fig. 15 is a section on the line 15—15 of Fig. 14, looking in the direction of the arrows.

In the present embodiment of my invention, the casing 1 of the pressing chamber is provided with an opening 2 in the top thereof for the introduction of hay, and with a follower 3 movable through the casing for compressing the hay, such being the ordinary construction of hay balers. The casing is also provided with a side opening 4 within which is hinged a swinging door 5, the door being hinged to the casing as at 6 and adapted to be opened inwardly, the said door being provided with flanges 7 at each side to limit the outward movement thereof. The door is provided with spaced upper and lower horizontal openings 8 therethrough, and with slots 9 on its inner face communicating with the openings, the said openings being provided for the needles 31 to be hereafter described. Friction wheels 10 are arranged upon the outer face of the door for rolling engagement with the follower 3, when the door is moved inwardly.

Brackets 12 project from the hinged edge of the door as shown in Fig. 1, the brackets being provided with bearings in their free ends through which passes a bolt 13, the said bolt being secured in position by a nut 14. A V-shaped link 15 is pivotally mounted upon the bolt, and an angular lever 16 provided with an extension 17 pivoted at 18 to the casing, has one of its ends connected with the V-shaped link, the other end being provided with a handle 19 for convenience in manipulating the lever. It will be evident from the description that when the handle 19 of the lever 16 is moved in the direction of the arrow in Fig. 1, the door will be swung inward into position for engagement by the follower.

Links 20 are pivoted upon the bolt outside of the V-shaped link, and each link has connected thereto one end of a spring 21, the other end of the spring engaging a lug 23 on a bracket 22 secured to the casing by a bolt 24 and provided on the opposite side of the bolt from the lug with a bearing 25.

A crank shaft 26 is journaled in the bearings 25, and the cranked portion 27 of the said shaft has journaled thereon a roller 28, and a link 29 connects the roller and the bolt 13 before described. The outer ends of the crank shaft 26 are extended at right angles to the shaft to form arms 30, normally projecting outwardly at right angles to the casing as clearly shown in Fig. 2.

A needle 31 is arranged in each of the openings 8, the needles being cylindrical in form, and being provided at approximately their center with a slot 32, through which pass the arms 30 before described. That end of the needle engaging the opening through the door is provided at its point with a slot 33, and a pin 34 crosses the slot near the point of the needle. A grooved wheel or roller 35 is journaled in the slot behind the pin, as shown in Fig. 4, for a purpose to be hereafter described.

Guide rods 36 for the needles project from the hinged edge of the door, the said rods being provided with loops 37 at their free ends through which the needles slide, and with bearings 38 adjacent to the edge of the door for supporting stud shafts 39, upon which are journaled reels 40 for carrying the binding wire.

The casing is provided with slots 41 upon the opposite side from the swinging door, and in positions corresponding to the positions of the needles in the door and adjacent to the slots are secured plates 42, provided with overhanging flanges 43 forming guideways for a casing 49 to be presently described. The plates 42 are secured to the casing by rivets 44 and that portion of the plate covering the slot is cut away as at 45. A rack 47 is secured to each plate by rivets 48 for a purpose to be presently described.

Each of the casings 49 is provided with flanges 46 engaging the flanges 43 of a plate whereby to guide the said casing in its sliding movement, and the end of the casing toward the slot is open, the casing being cut away to correspond with the cut away portion of the plate, and being retained normally in the position shown in Fig. 3 by a spring 50.

A bracket 51 is secured to one side of the casing, by the screws 52$^a$, and the said bracket is provided with a closed bearing in which is journaled a shaft 53 and with an open bearing 54. The shaft 53 journaled in the closed bearing and in the side of the casing, has secured thereto a pinion 55 meshing with the rack 47 before described, and a gear wheel 56 meshing with a pinion 57 on a hollow shaft 58 journaled in the open bearing, the said shaft being provided on its inner face with a disk or flange 59 slotted as at 60, the slot leading from the edge of the disk to the hollow shaft. The pinion 57 is also slotted, and the hollow shaft is slotted throughout its length, as clearly shown in Figs. 11, 12 and 13.

A knife 59$^a$ is pivoted to the outer face of the pinion 57 adjacent to the slot, and is normally retained away from the slot by a spring 61 secured to the face of the pinion and engaging the knife. A lug 62 is arranged upon the face of the pinion, and a pin 63 is slidably mounted in the lug, one end of the pin being adapted to engage the knife to move it across the slot for a purpose to be hereafter described, and the other end being adapted for engagement with a projection 65 from the hub of the shaft 53 at each complete revolution of the gear wheel 56.

Pairs of lugs 66 are connected with the casing adjacent to each of the slots and a reel 67 is pivoted between each pair of lugs. A tension arm 68 is provided with a U-shaped body 69, and the arms of the U-shaped body are journaled upon each side of the reel, the free end of the arm being provided with an eye 70. The tension arm is normally retained in the position shown in Fig. 2, by a spring 71.

In operation, the wires from the reels 40 are passed over the grooved wheels 35 of the needles as shown in Fig. 2, and the wires from the reels 67 are passed through the eyes of the tension arms, and connected with the ends of the wires from the reels 40, as shown in Fig. 2. Hay is now introduced through the opening 2 in the top of the casing in the usual manner. When the follower moves forward to compress the hay, the twisted wires are pushed toward the outer end of the casing, and are forced to take the shape shown in Fig. 4 by the pressure of the follower. When sufficient hay has been introduced to make the bale, the lever 16 is moved to swing the swinging door into position for engagement by the follower, and the movement forward of the follower moves the door forward as shown in Fig. 4. The swinging of the door through the link 29 rotates the crank shaft 26, to cause the needles 31 through drivers 30 to move the needles 31 through the openings in the door to the position shown in Fig. 4. The ends of the needles pass through the slots on the opposite side of the casing, and the pin and grooved wheel engages the wire from the reel on the opposite side of the casing. When the needle reaches the position shown in Fig. 4, the twisting device is in such position that the two wires are passed into the slot before described. When this position is reached, pins 72 on the opposite side of the door from the wheels before mentioned, engage the edge of the casing of the twisting mechanism, and force the same outwardly against the resistance of the springs. This movement rotates the twisting device through the pinion and rack, and twists the wire, the gearing being so proportioned that a complete revolution of the gear wheel will impart a sufficient number of twists to the wires to hold them firmly. At the end of this complete revolution, the lug on the hub of the gear wheel shaft, engages the pin and forces the knife across the slot to sever the wires intermediate the twisted portions. It will be evident that since the wires are engaged intermediate their ends, two twists will be formed one on each side of the twisting mechanism, so that when the wire encircling the bale is severed, the ends of the wire from the opposite reels will remain secured together. On the reverse movement of the follower, the needles return to their original position as the door swings outwardly, and the next forward movement of the follower places the wires in position for another bale.

I claim:

1. In a hay baler, the combination with the pressing chamber and the follower reciprocable therein, of a door hinged to the side of the pressing chamber and adapted to be swung thereacross by the forward movement of the follower, said door being provided with upper and lower horizontal transverse openings therethrough, and with slots on its inner face communicating with the openings, brackets projecting from the hinged edge of the door, a bolt connecting the free ends of the brackets, a V-shaped link pivoted on the bolt, a lever pivoted to the chamber and connected by one end to the link, whereby to swing the door into the path of movement of the follower, brackets provided with bearings secured to the chamber and spaced apart from the hinged edge of the door, springs connecting said brackets with the brackets on the door, a crank shaft journaled in the bearings, the ends of said shaft being bent at right angles to the shaft and normally projecting at right angles from the chamber, a link connecting the cranked portion of the shaft with the bolt, needles arranged in the openings in the door, said needles being provided intermediate their length with slots through which pass the extended ends of the crank shaft, and with longitudinal slots at the end engaging the door, pins crossing said last named slots, grooved wheels journaled in the slots behind the pins and projecting through the slots of the door, needle guides projecting from the hinged edge of the door and comprising bars provided with a bearing adjacent the door, and with a loop at their free end through which passes the needle, wire carrying reels journaled in the bearings, wire carrying reels on the opposite side of the chamber, and a twisting mechanism adjacent to each of said last named reels, the needles engaging the wires from said last named reels with the pin and from said first named reels with the grooved wheel, whereby to insert said wires in the twisting mechanism.

2. The combination with the pressing chamber and the follower reciprocable therein, of a door hinged to the side of the pressing chamber and adapted to be swung thereacross by the forward movement of the follower, wire supporting reels connected with the door, needles movable transversely within the door and provided with grooved wheels over which pass the wires from the reels, guides for the needles, wire carrying reels on the opposite side of the chamber from the door, a twisting mechanism adjacent to each of said last named reels, said needles being provided with slots intermediate their length, needle drivers engaging the slots, means whereby the swinging of the door across the chamber will operate the drivers to move the needles transversely of the door to insert the wires in the twisting mechanism, means whereby the continued movement of the door will operate the twisting mechanism to twist the wires, and means in connection with the twisting mechanism for severing the wires after the twisting thereof at approximately the center of the twisted portion thereof.

3. The combination with the pressing chamber and the follower reciprocable therein, of a door hinged to the side of the pressing chamber and adapted to be swung thereacross by the forward movement of the follower, wire supporting reels connected with the door, needles movable transversely in the door and provided with grooved wheels over which pass the wires from the reels, guides for the needles comprising bars connected with the door and provided adjacent to the door with bearings in which said reels are journaled and at their free ends with loops through which pass the needles, wire carrying reels on the opposite side of the chamber from the door, a twisting mechanism adjacent to each of said last named reels, means whereby the swinging of the door across the chamber will move the needles transversely of the door to insert the wires in the twisting mechanism, means whereby the continued movement of the door will operate the twisting mechanism to twist the wires, and means in connection with the twisting mechanism for severing the wires after the twisting thereof at approximately the center of the twisted portion thereof.

4. The combination with the pressing chamber and the follower reciprocable therein, of a door hinged to the side of the pressing chamber and adapted to be swung thereacross by the forward movement of the follower, wire supporting reels connected with the door, needles movable transversely within the door and provided with grooved wheels over which pass the wires from the reels, guides for the needles, wire carrying reels on the opposite side of the chamber from the door, a twisting mechanism adjacent to each of said last named reels, a crank shaft journaled on the chamber and spaced apart from the door, the ends of said shaft being extended at right angles to the chamber, said needles being provided with slots through which said extended ends pass, a connection between the crank portion of the shaft and the door, whereby the swinging of the door across the chamber will move the needles to insert the wires in the twisting mechanism, means whereby the continued movement of the door will operate the twisting mechanism to twist the wires, and means in connection with the twisting mechanism for severing the wires after the twisting thereof at approximately the center of the twisted portion thereof.

5. The combination with the pressing chamber and the follower reciprocable therein, of a door hinged to the side of the pressing chamber and adapted to be swung thereacross by the forward movement of the follower, means for swinging the door into the path of the follower, comprising brackets projecting from the hinged edge of the door, a bolt connecting the brackets, a link pivoted on the bolt, a lever pivoted to the casing and having one end connected with the link, springs connected with the bolt for normally retaining the door out of the path of the follower, wire supporting reels connected with the door, needles movable transversely within the door and provided with grooved wheels over which pass the wires from the reel, guides for the needles, wire carrying reels on the opposite side of the chamber from the door, a twisting mechanism adjacent to each of said last named reels, means whereby the swinging of the door across the chamber will move the needles transversely of the door to insert the wires in the twisting mechanism, means whereby the continued movement of the door will operate the twisting mechanism to twist the wires, and means in connection with the twisting mechanism for severing the wires after the twisting thereof at approximately the center of the twisted portion thereof.

6. The combination with the pressing chamber and the follower reciprocable therein, of a door hinged to the side of the pressing chamber and adapted to be swung thereacross by the forward movement of the follower, means for swinging the door into the path of movement of the follower, wire supporting reels connected with the door, needles movable transversely within the door and provided with grooved wheels over which pass the wire from the reels, guides for the needles, wire carrying reels on the opposite side of the chamber from the door, a twisting mechanism adjacent to each of said last named reels, means whereby the swinging of the door across the chamber will move the needles transversely of the door to insert the wires in the twisting mechanism, means whereby the continued movement of the door will operate the twisting mechanism to twist the wires, and means in connection with the twisting mechanism for severing the wires after the twisting thereof, at approximately the center of the twisted portion thereof.

7. The combination with the pressing chamber and the follower reciprocable therein, of a door hinged to the side of the pressing chamber and adapted to be swung thereacross by the forward movement of the follower, wire supporting reels connected with the door, needles movable transversely within the door, and provided with grooved wheels over which pass the wire from the reels, guides for the needles, wire carrying reels on the opposite side of the chamber from the door, a twisting mechanism adjacent to each of said last named reels, means whereby the swinging of the door across the chamber will move the needles transversely of the door to insert the wires in the twisting mechanism, means whereby the continued movement of the door will operate the twisting mechanism to twist the wire, and means in connection with the twisting mechanism for severing the wires after the twisting thereof at approximately the center of the twisted portion thereof.

8. The combination with the pressing chamber and the follower reciprocable therein, of a door hinged to the side of the pressing chamber and adapted to be swung thereacross by the forward movement of the follower, wire supporting reels connected with the door, needles movable transversely within the door and provided with grooved wheels over which pass the wires from the reels, wire carrying reels on the opposite side of the chamber from the door, a twisting mechanism adjacent to each of said reels, means whereby the swinging of the door across the chamber will move the needles to insert the wires in the twisting mechanism, means whereby the continuous movement of the door will operate the twisting mechanism to twist the wires, and means in connection with the twisting mechanism for severing the wires after the twisting thereof at approximately the center of the twisted portion.

9. The combination with the pressing chamber and the follower reciprocable therein, of a door hinged to the side of the pressing chamber and adapted to be swung thereacross by the forward movement of the follower, wire supporting reels connected with the door, needles movable transversely within the door, wire carrying reels on the opposite side of the chamber from the door, a twisting mechanism adjacent to each of said reels, means in connection with the needles for engaging the wires from the reels, means whereby the swinging of the door across the chamber will move the needles transversely of the door to insert wires in the twisting mechanism, means whereby the continued movement of the door will operate the twisting mechanism to twist the wires, and means in connection with the twisting mechanism for severing the wires after the twisting thereof at approximately the center of the twisted portion.

10. The combination with the pressing chamber and the follower reciprocable therein, of a door adapted to be swung across the pressing chamber by the movement of the follower, wire supporting means on opposite sides of the chamber, a twisting mechanism adjacent to the wire supporting means, means whereby the swinging of the door across the chamber will insert the wires in the twisting mechanism, means whereby the continued movement of the door will operate said twisting mechanism to twist the wires, and means in connection with the twisting mechanism for severing the wires at approximately the center of the twisted portion.

11. The combination with the pressing chamber and the follower reciprocable therein, of a door adapted to be swung across the pressing chamber by the movement of the follower, wire supporting means on opposite sides of the chamber, a twisting mechanism adjacent to the wire supporting means, means whereby the swinging of the door across the chamber will insert the wires in the twisting mechanism, means whereby the continued movement of the door will operate said twisting mechanism to twist the wires, and means operated by the twisting mechanism for severing the wires.

12. The combination with the pressing chamber and the follower reciprocable therein, of wire supporting means on each side of the chamber, a twisting mechanism, needles mounted to swing transversely across the chamber in a horizontal plane, means in connection with the needles for engaging the wires and inserting them in the twisting mechanism, means operated by the follower for moving the needles and for operating the twisting mechanism, and means operated by the twisting mechanism for severing the wires at approximately the center of the twisted portion and manually-operated means for swinging the needles into the path of movement of the follower.

13. The combination with the pressing chamber and the follower reciprocable therein, of wire supporting means on each side of the chamber, a twisting mechanism, needles mounted to swing transversely across the chamber, means in connection with the needles for engaging the wires and inserting them in the twisting mechanism, and means operated by the follower for moving the needles and for operating the twisting mechanism and manually operated means for swinging the needles into the path of movement of the follower.

14. The combination with the pressing chamber and the follower reciprocable therein, of wire supporting means on each side of the chamber, a twisting mechanism, needles mounted to swing transversely across the chamber, means in connection with the needles for engaging the wires and inserting them in the twisting mechanism, and means for moving the needles and operating the twisting mechanism and manually operated means for swinging the needles into the path of movement of the follower.

15. The combination with the pressing chamber, of wire supporting means on each side thereof, a twisting mechanism comprising a casing slidable alongside of the chamber, a shaft journaled in the casing, a pinion on the shaft, a rack on the side of the chamber, with which the pinion meshes, a gear wheel on the shaft, a second shaft journaled in the casing, a pinion on the said second shaft with which the gear wheel meshes, said second shaft being slotted, the slot extending through the pinion, means movable transversely of the casing for engaging the wires and inserting them in the slot, means in connection with said last named means for moving the casing whereby to rotate said slotted shaft to twist the wires, a knife pivoted to the face of the pinion and movable across the slot to sever the wires, and means in connection with the gear wheel for operating said knife once during each revolution of said gear wheel.

16. The combination with the pressing chamber, of wire supporting means on each side thereof, a twisting mechanism comprising a casing slidable on the side of the chamber, a slotted shaft journaled in the casing, a pinion on the shaft through which the slot extends, means movable transversely of the casing for engaging the wires and inserting them in the slot of the shaft, a knife pivoted to the face of the pinion and movable across the slot, means operated by the sliding movement of the casing for rotating said pinion, and means for moving the knife across the slot once during each revolution of said shaft.

17. The combination with the pressing chamber, of wire supporting means on each side thereof, a twisting mechanism comprising a pinion slidable on the side of the chamber, said pinion having a slot therethrough, a knife pivoted to the face of the pinion and movable across the slot, means operated by the sliding movement of the pinion for rotating the same, and means for moving the knife across the slot once during each rotation of the pinion.

ROBERT E. ZIMMERMAN.

Witnesses:
JAS. GRIFFIN,
G. W. STRAHAN.